R. STANICCI.
NON-SLIPPING HORSESHOE.
APPLICATION FILED APR. 16, 1914.
1,129,244.
Patented Feb. 23, 1915.
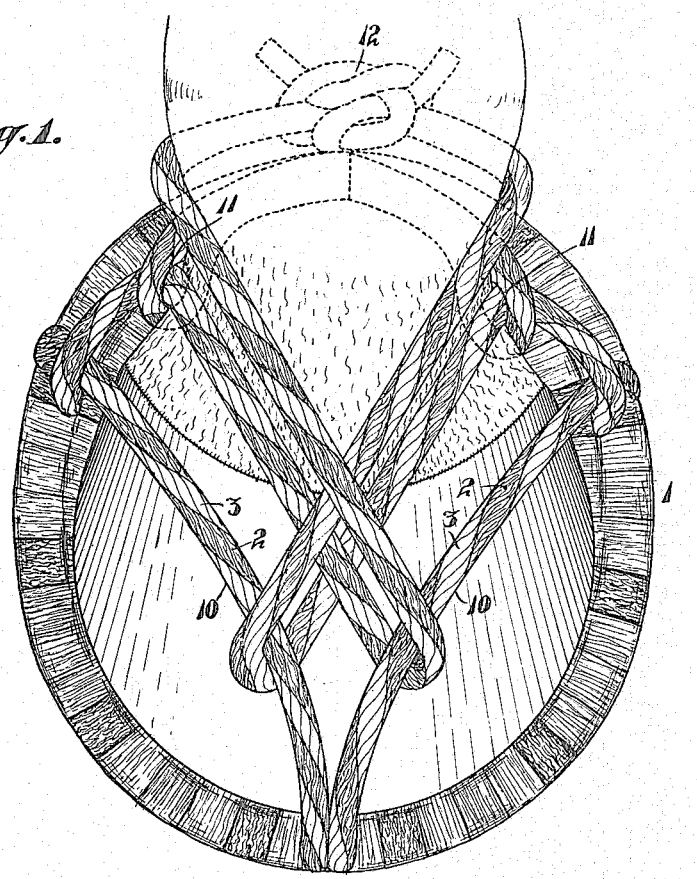
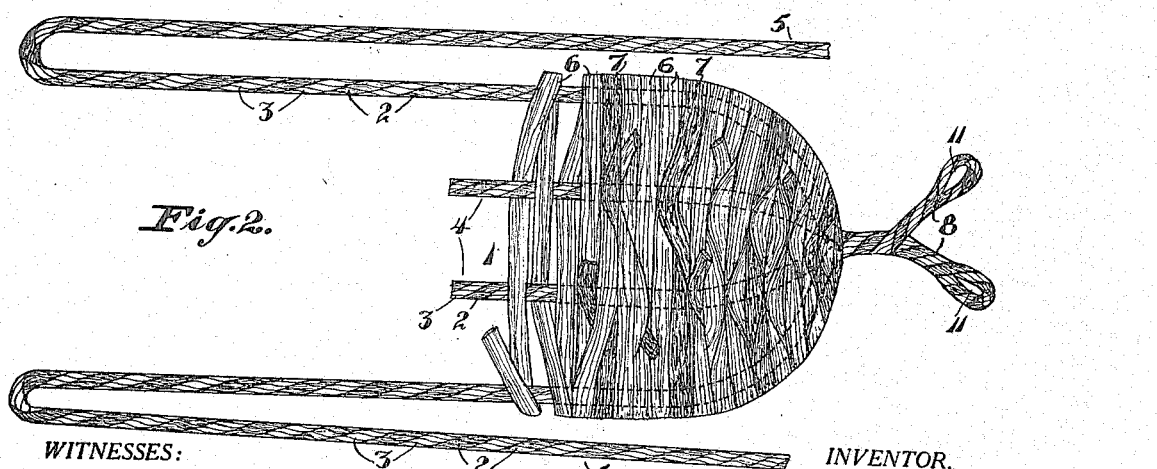
WITNESSES:
F. C. Fliedner
G. M. Ball
INVENTOR,
Riccardo Stanicci,
BY Francis M. Wright,
ATTORNEY

UNITED STATES PATENT OFFICE.

RICCARDO STANICCI, OF SAN FRANCISCO, CALIFORNIA.

NON-SLIPPING HORSESHOE.

1,129,244.  Specification of Letters Patent.  Patented Feb. 23, 1915.

Application filed April 16, 1914. Serial No. 832,185.

*To all whom it may concern:*

Be it known that I, RICCARDO STANICCI, subject of the King of Italy, residing at San Francisco, in the county of San Francisco and State of California, have invented new and useful Improvements in Non-Slipping Horseshoes, of which the following is a specification.

This invention relates to a shoe or pad adapted to be secured to a horse's hoof to prevent slipping.

With the pavements of asphalt and other smooth materials that have recently come into general use, it has been a matter of constant observation, particularly during wet weather, that horses, especially those engaged in drawing heavy loads, find it difficult to secure a foot-hold upon the pavement.

It is the object of my present invention to provide an auxiliary horse-shoe which will remedy this evil.

In the accompanying drawing, Figure 1 is a plan view of the horse-shoe which is in position on a horse's hoof; Fig. 2 is a plan view of the horse shoe in the process of manufacture.

Referring to the drawing, 1 indicates strands of any sufficiently strong and flexible material, twisted together. I preferably use strands 2 of jute and 3 of straw, as this combination provides a sufficient degree both of strength and flexibility. Each of these strands is bent or folded unequally so as to provide a short end 4 and a long end 5. The strands are then laid with their folds somewhat close together and extending first divergently and then parallel from said folded ends, and at a sufficient distance from each other. There are then woven around said strands, as shown in Fig. 2, lengths 6, 7, of straw and jute fiber, the ends of the lengths being tied together on the under side. The two loops are then twisted together, as shown at 8, the two long ends 5 are passed, first, around the outer strands at about the middle of the horse-shoe, forming a loop 10, and then through the two loops 11 formed by the twisted portions of the strands. The horse shoe is now complete and ready to be applied to the hoof of the horse.

The horse's hoof is placed upon the concave upper portion of the horse shoe or pad, and each long end 5 is passed over the hoof and then under the opposite loop 10 and then the two ends are placed around the horse's hoof to the rear and tied together at the rear, as shown at 12.

I find that a horse-shoe or pad of this construction forms an almost perfect protection against slipping, as well as a soft and yielding cushion for the hoof.

I claim:—

1. A horse-shoe formed of straw and jute fiber, part only being twisted and formed into strands, and the remainder being woven about said strands in an untwisted condition, the ends of said strands being tied together around the horse's hoof.

2. A horse-shoe comprising outer and inner strands, of flexible material, lengths of flexible material woven about said strands, the strands being twisted together at one end of the horse-shoe to form loops, the strands being tied together at the other end of the horse-shoe, two of said strands being extended to a sufficient length to permit them to pass through said loops when tied around the horse's hoof.

3. A horse-shoe comprising outer and inner strands of flexible material, lengths of flexible material woven about said strands, the strands being twisted together at one end of the horse-shoe to form loops, the strands being tied together at the other end of the horse-shoe, two of said strands extending first around the outermost strands at substantially the middle of the horse-shoe and of a sufficient length to permit them to pass through said loops when tied around the horse's hoof.

In testimony whereof I have hereunto set my hand in the presence of two subscribing witnesses.

RICCARDO STANICCI.

Witnesses:
F. M. WRIGHT,
D. B. RICHARDS.

Copies of this patent may be obtained for five cents each, by addressing the "Commissioner of Patents, Washington, D. C."